United States Patent [19]

Castagna et al.

[11] 4,075,277
[45] Feb. 21, 1978

[54] PROCESS FOR RECOVERING MOLYBDENUM VALUES FROM SPENT CATALYSTS

[75] Inventors: Herman Castagna, Moutiers; Guy Gravey, Saint Marcel; Andre Roth, Moutiers, all of France

[73] Assignee: Metaux Speciaux S.A., Paris, France

[21] Appl. No.: 763,911

[22] Filed: Jan. 31, 1977

[30] Foreign Application Priority Data

Feb. 5, 1976 France .................................. 76 03674

[51] Int. Cl.$^2$ ............................................. C01G 39/00
[52] U.S. Cl. .......................................... 423/55; 423/53; 423/606; 423/593; 423/61; 75/121
[58] Field of Search ..................... 423/53, 55, 56, 61, 423/606; 75/97 R, 101 R, 121

[56] References Cited

U.S. PATENT DOCUMENTS

| 1,293,404 | 2/1919 | Giles et al. | 423/55 |
| 1,948,407 | 2/1934 | Watts | 423/55 |
| 2,367,506 | 1/1945 | Kissock | 423/55 |
| 3,622,301 | 11/1971 | Mehl et al. | 423/53 |
| 3,773,890 | 11/1973 | Fox et al. | 423/61 |

Primary Examiner—Herbert T. Carter
Attorney, Agent, or Firm—Dennison, Dennison, Meserole & Pollack

[57] ABSTRACT

A process of recovering molybdenum in the form of molybdic acid from waste products and particularly from spent catalysts containing a support based on gamma-alumina wherein the molybdenum is in the form of molybdenum oxide or molybdenum sulfide comprising treating the waste products with sodium carbonate and heating to convert the molybdenum present to sodium molybdate, and converting the sodium molybdate to molybdic acid by treatment with concentrated nitric acid to produce molybdic acid high in purity that is suitable for the production of molybdenum compounds as well as for the recovery of the pure metal.

7 Claims, 1 Drawing Figure

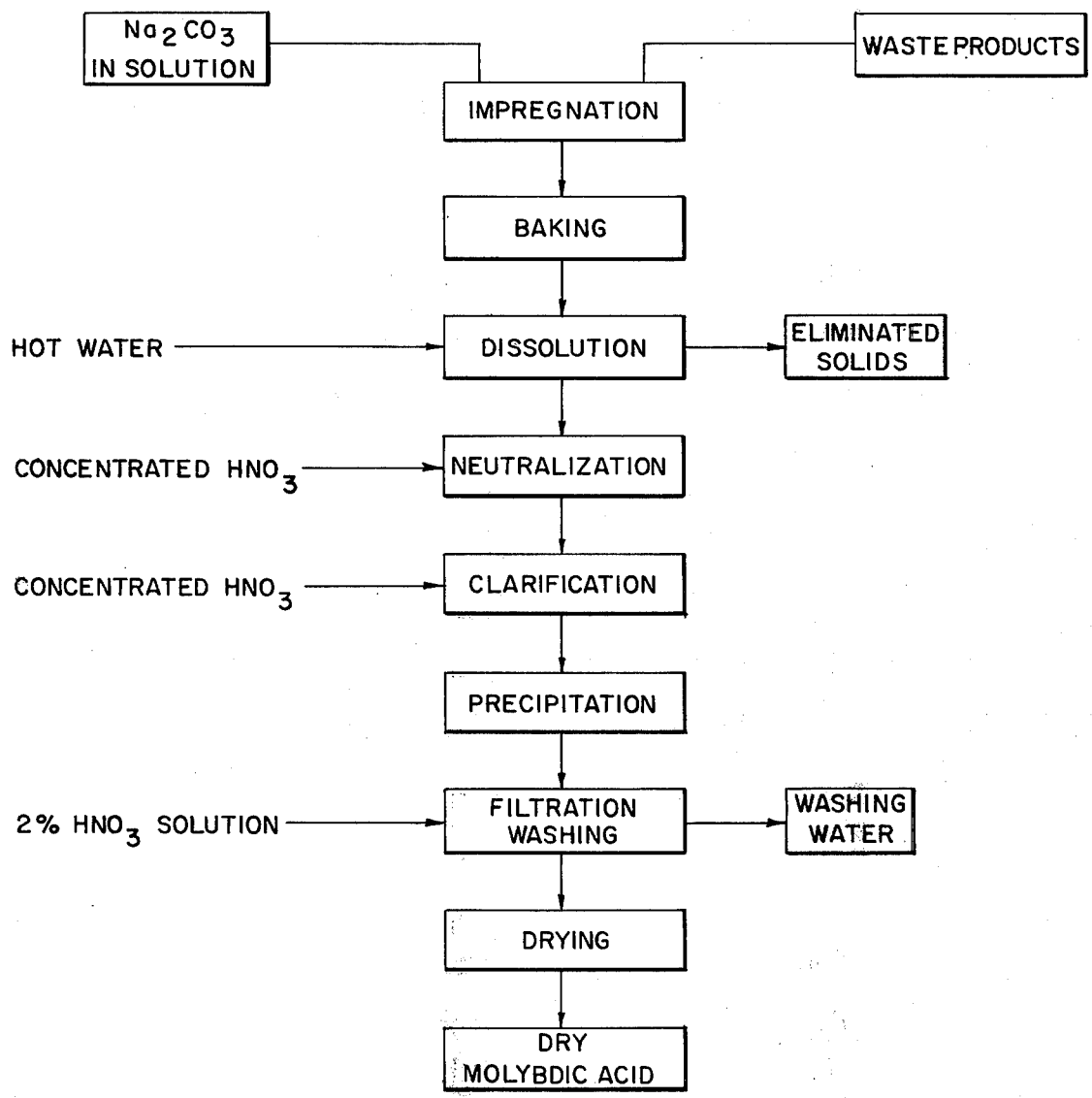

PROCESS FOR RECOVERING MOLYBDENUM VALUES FROM SPENT CATALYSTS

This invention relates to a new process for recovering the molybdenum present in waste, above all in spent catalysts, containing one or more oxides of molybdenum associated with alumina and other metallic oxides. The catalysts in question are in particular those of the type used for the desulfurization of petrols. Catalysts of this kind contain a support based on gamma-alumina impregnated with one or more molybdenum compounds. These compounds are generally oxides, such as $MoO_3$, which are themselves obtained by the dissociation of a salt, such as ammonium molybdate. Other metal compounds, in particular cobalt oxide and/or nickel oxide, are often present in the catalyst as active constituents thereof. Finally, the catalyst contains impurities, most of which remain fixed on the catalyst throughout its service life. This is particularly the case with various organic compounds, such as those containing sulfur.

Before undertaking their chemical treatment, it is standard practice to subject these waste products to an oxidizing roasting at a temperature generally below 600° C in order to eliminate, in the form of volatile compounds, the hydrocarbons, the carbon and part of the sulfur with which they are impregnated. This treatment is often carried out in the same column which is used for treating the hydrocarbons. After this roasting, the molybdenum present in the catalyst is in the form of its oxide or sulfide. The molybdenum may then be separated and recovered in a usable form by various methods.

In this connection, reference is made in particular to French Pat. No. 701,426 which relates to a process for the treatment of catalysts used for the hydrogenation of coal, oils and tars. In addition to an alumina-based support, these catalysts contain metal compounds based on Mo, Cr, Zn and Mg. The inventor found that if these catalysts were roasted at a temperature below 500° C, it was possible to solubilize the Mo with a solution of ammonia which enables an ammonium molybdate to be obtained, the other metals remaining unaffected or only slightly affected. It is then possible to precipitate the molybdic acid with hydrochloric acid at boiling temperature. This process has the major disadvantage of a low reaction velocity between the ammonia and the molybdenum oxide contained in the catalyst. In addition, the extraction yield is low, a significant proportion of the molybdenum oxide being retained in the inert materials. Finally, the molybdenum sulfide is hardly affected by the ammonia.

U.S. Pat. No. 2,367,506 relates to recovery of the molybdenum present in spent hydroforming catalysts based on compounds of molybdenum with a support of activated alumina. It describes a method which comprises immersing the pellets of spent catalyst in a solution of sodium carbonate until they are completely impregnated and then heating the pellets thus impregnated for 30 minutes at a temperature of 1150° C, for example in a rotary furnace. Under these conditions, the alumina is rendered substantially insoluble and the sodium aluminate formed may then be dissolved in water, entraining only a small quantity of aluminum in the form of sodium aluminate. The process thus described has the disadvantage of reducing the solubility of the molybdate formed and, in fact, the dissolution thereof in water becomes difficult. Finally, it has been found that it is not possible to avoid the dissolution of alumina which has to be separated by additional treatments if it is desired to recover a sufficiently pure molybdenum compound.

The process according to the invention enables the disadvantages of conventional processes to be overcome. In particular, it enables the molybdenum contained in the spent catalysts to be completely recovered without, at the same time, entraining significant quantities of aluminum. It also enables catalysts to be treated after preroasting at temperatures of preferably below 600° C without this preroasting temperature level being particularly critical either from the point of view of the conditions of solubilization of the molybdenum or from the point of view of the extraction yield. The process according to the invention also provides for a significant saving of reactants because the quantities used are strictly proportional to the composition of the materials to be treated. Finally, by virtue of the development of an original method for precipitating molybdic acid, it is possible to obtain the molybdic acid in highly pure form, its aluminum content being lower than that which is normally obtained by processes of the type described in U.S. Pat. No. 2,367,506.

The process according to the invention comprises, in a first step, impregnating the catalyst with an aqueous solution of sodium carbonate and then heating the catalyst thus impregnated to a temperature high enough to convert most of the molybdenum present into sodium molybdate while, at the same time, preventing an excessively large quantity of alumina from being converted into sodium aluminate. In order to obtain this result, it has been found to be necessary to have an excess of sodium carbonate in relation to the quantities which are strictly necessary for forming sodium molybdate, $Na_2MoO_4$, from the molybdenum present and for fixing the sulfur in the form of $Na_2SO_4$. If the excess of sodium carbonate is too small, the conversion yield of the molybdenum present into sodium molybdate decreases, while on the other hand if this excess is too large, the quantity of alumina converted into aluminate increases, giving rise to a higher consumption of reactants and to greater difficulties in subsequently separating this aluminum converted into soluble form.

In practice, the molybdenum content of the waste products of the catalyst, after they have been roasted to eliminate the volatile compounds, the carbon and part of the sulfur, is generally of the order of 4 to 12%, while their sulfur content amounts to between 0.5 and 4%. These values are purely indicative and certain types of catalyst waste may have Mo or S contents which exceed these limits. The inventors have found that the excess of sodium carbonate should not exceed 10% by weight, based on the products to be treated, and preferably amounts to between 1 and 3% by weight. In order suitably to adjust this excess, it is necessary to determine with sufficient accuracy the Mo and S contents of the waste catalyst products which it is intended to treat. The impregnation treatment should be carried out in such a way that all the catalyst pellets uniformly absorb the reactant. This result may be obtained for example by spraying a bed of pellets which is stirred to produce a systematic movement of the pellets during the spraying period. The solution volume depends to a limited extent upon the specific surface of the catalyst and is of the order of 200 to 500 cc per kg of treated catalyst. The concentration of $Na_2CO_3$ varies widely according to the Mo and S contents, as has just been explained.

This impregnation is followed by heating at a temperature of from about 600° to 800° C and preferably at a temperature of from 650° to 750° C. It has been found that, in this temperature range, the molybdenum present in the form of molybdenum oxide or sulfide may be almost completely converted into molybdate soluble in hot water (80° C) over a short period of the order of one hour. At this temperature, the oxides of cobalt and nickel optionally present do not react with the sodium carbonate to any significant extent and remain substantially insoluble in water. Although in this temperature range the reaction velocity of the alumina with the sodium carbonate is very low, it is still not possible to prevent small quantities of sodium aluminate from being formed. As mentioned above, these quantities remain limited provided that the temperature conditions and treatment time are respected and provided that the excess of sodium carbonate introduced does not exceed the limits specified. After this heat treatment, the catalyst pellets are treated while stirring with hot water until the sodium molybdate has been dissolved as completely as possible. This result may be obtained at temperatures of from 60° to 100° C by treatments lasting approximately one hour. It is generally desired to obtain relatively concentrated solutions containing, for example, of the order of 100 g/l of sodium molybdate. These solutions also contain sodium aluminate. By virtue of the operating conditions defined above, the ratio of Al/Mo in solution is generally of the order of 10%, in many cases even lower, and scarcely exceeds 20%. As already mentioned, these solutions also contain sodium sulfate and free sodium carbonate. The most important step of the process is the separation of the molybdenum in the form of molybdenum hydrate from the sodium aluminate and the alkali salts. In this respect, it has unexpectedly been found that it is possible to convert the initial basic solution into an acid solution from which the molybdic acid will subsequently be precipitated without any danger of the sodium aluminate being partially hydrolyzed. This apparently complex operation is carried out in a precise, reproducible manner by a simple and original method. This method comprises treating the solution in two successive reactors of the same capacity which are arranged one behind the other in such a way that the input and output rates of these two reactors are equal and constant. The first reactor receives the solution emanating from the extraction with hot water of the soluble salts contained in the catalyst after treatment with sodium carbonate. This solution is cooled to enter the first reactor at a temperature not exceeding 30° C. A stream of nitric acid is continuously introduced into this same reactor at a rate of flow adjusted in such a way that the pH value of the solution is between 5 and 6, and preferably of the order of 5.2 to 5.5. This rate of flow may be adjusted by known means, such as a metering pump, of which the output is continuously regulated by means of a pH meter of which the probe is placed in the reactor itself. The nitric acid is preferably introduced in concentrated form. Since the reaction is exothermic, the reactor should be equipped with cooling means known to the expert, such as a double jacket or refrigeration coils, and, optionally, agitators, to enable the temperature of the solution to be kept at a value not appreciably exceeding 20° C and, in any case, below 30° C. Under these conditions, the free sodium carbonate is neutralized and the sodium aluminate is decomposed to the point where precipitation commences, which gives the solution a slightly clouded appearance. The solution then enters the second reactor at a constant rate of flow, for example by overflowing. A stream of nitric acid is continuously introduced into this reactor, too, at a rate of flow substantially equal to that adjusted in the first reactor, as has just been mentioned. A simple way of obtaining this result is to use a metering pump comprising two separate circuits with a single regulating system which enables two flows of equal volume to be obtained at any instant, one feeding the first reactor and the other the second reactor. It is sufficient to feed each circuit from a common reservoir so as to be certain of introducing the same quantities by weight of nitric acid. Like the first reactor, the second reactor is equipped with a cooling system enabling the temperature of the solution to be kept below 30° C. By virtue of the excess of nitric acid thus introduced, it is possible on the one hand to redissolve the alumina which tends to precipitate, and, on the other hand, to create the conditions favorable to the precipitation of molybdic acid. In order to obtain this precipitation, it is necessary to heat the solution to a temperature close to its boiling point. This is preferably done in one or more precipitators which receive the solution issuing from the second reactor and heat it to approximately 100° C. The precipitate obtained is then washed, rinsed and dried in the ususal way. This precipitate based on molybdic acid monohydrate contains only small quantities of aluminum. Its Mo content, expressed in percent of dry product, is substantially equal to or greater than 60%, while its Al content is less than 0.1% and may even fall below 0.01%.

The following nonlimiting example describes a continuous embodiment of the process according to the invention. The single FIGURE is a flow chart illustrating the successive steps of this process. The waste catalyst products to be treated have undergone preliminary oxidizing roasting at a temperature of the order of 500° C, which has substantially freed them from volatile materials, carbon and part of the sulfur. They are in the form of small cylinders or small balls. These waste products now contain 8% of Mo, 1.5% of S, and approximately 2% of Co; the support is based on gamma-alumina. These waste products are treated in a rotary mixer with an aqueous solution heated to approximately 70° C and containing 400 g/liter of $Na_2CO_3$. Mixing is carried out in batches of 100 kg which are mixed for about thirty minutes with 37.5 liters of solution. The quantity of $Na_2CO_3$ amounts to 150 g per kg of waste products. Calculation shows that the quantity of $Na_2CO_3$ theoretically necessary for converting the 8% of Mo into sodium molybdate amounts to approximately 87 g per kg of waste products. Similarly, the quantity of $Na_2CO_3$ required for converting the 1.5% of S into sodium sulfate amounts to 44 g per kg of waste products. Accordingly, this leaves an excess of 19 g of $Na_2CO_3$ per kg of waste products, i.e., 1.9%. The waste products are alternately impregnated in two mixers arranged in parallel so as to enable a batch which has just been impregnated to be progressively transferred to the baking furance while a second batch is being impregnated.

The baking furnace is a rotary furnace approximately 4.2 meters long with an internal diameter of 630 mm which is heated to between 650° and 750° C by a propane burner. At one end, it is continuously fed with impregnated product at a rate of approximately 100 kg/hour. The residence time of the product in the hot zone of the furnace is fixed at about one hour by means well known to the expert. At the output end of the furnace, the temperature of the product is lowered to between 70° and 80° C by passage through a cooler of which the walls are cooled by the circulation of water. Approximately 95% of the molybdenum contained in the product is then present in the form of sodium molybdate.

The sodium molybdate is dissolved by washing the product in a layer approximately 10 cm thick in countercurrent on a continuous belt filter with a filtering surface of 1 square meter.

The washing unit comprises six stages: the sixth and last stage is fed with hot water at 80° C at a rate of approximately 120 liters per hour. The concentrated solution of sodium molybdate is removed at the output end of the first stage at a rate of about 104 liters per hour with a content of from 45 to 50 g/l of Mo in dissolved form. The washed solid product which is removed from the belt after washing with pure water in the last stage contains approximately 0.27% of Mo in soluble form. Accordingly, the washing yield is of the order of 97%. The solution containing the Mo is introduced into a first neutralization reactor at a constant rate adjusted to 104 liters per hour. At the same time, a first metering pump introduces an HNO$_3$ solution with an HNO$_3$ concentration of 53% into the reactor. The reactor is equipped with cooling means in the form of a double jacket filled with circulating water so as to keep the temperature below 20° C. The volume of this reactor is approximately 150 liters and the residence time of the solution is slightly more than one hour. The operation of this first metering pump is controlled by a probe for continuously measuring pH which is placed in the reactor so as to maintain a pH in the range from 5.2 to 5.5. Under these conditions, the average output of the pump is 8 liters per hour. The solution, which is slightly cloudy because of the incipient precipitation of alumina, enters a second clarification reactor equal in volume to the first reactor where it receives another addition of nitric acid by means of a second metering pump which is controlled in dependence upon the first metering pump so that it delivers exactly the same volume of a nitric acid which has the same composition because it is taken from the same reservoir. The temperature of this reactor is kept below 30° C again by the circulation of water through a double jacket.

Under these conditions, the alumina is redissolved and clarified. The solution then enters a third precipitation reactor which has the same volume as the first two reactors and which is heated to 100° C by the circulation of steam through a double jacket.

Under these conditions, the molybdic acid precipitates while most of the aluminum remains in solution. An agitator enables the precipitate to be kept in suspension. The suspension is then delivered to a rotary filter on which the precipitate is collected and continuously washed with demineralized water containing 2% by volume of concentrated HNO$_3$. The precipitate then enters a hot air dryer where it is heated to approximately 100° C. This precipitate, based on molybdic acid, has an average Mo content of 61.2%. Its aluminum content is only 0.004%. Its mean apparent density is 2. The yield of Mo recovered in the form of molybdic acid based on the Mo contained in the waste products amounts to approximately 85%.

The process which has just been described in this example may be modified in numerous ways without departing from the scope of the invention because there are numerous equivalent ways of carrying out the essential steps of the method according to the present invention. In particular, it is possible to carry out in a single stage the operations of neutralization and clarification of the solution containing the sodium molybdate extracted by washing. In this case, it is sufficient to introduce into a single reactor a quantity of HNO$_3$ equal to the sum of the quantities which are successively introduced into the two reactors. In that case, more difficulties are encountered in controlling the temperature of the solution which should not appreciably exceed 30° C in order to avoid irreversible precipitation of the aluminum.

Finally, it has been found that, during the subsequent precipitation of the molybdic acid, there is a greater risk of the molybdic acid being obtained in a light partly colloidal form in which it is very difficult to filter. By contrast, when acidification is carried out in two stages, a dense precipitate of molybdic acid, which is easy to wash on a filter, is normally obtained.

This is an important factor in obtaining a molybdic acid of very low Al content which may be used in particular for the production of highly pure Mo powder by reduction with hydrogen.

The aforesaid sum of the quantities of nitric acid introduced is between 1.5 and 2.5 times the quantity which would be necessary to reach a pH value of from 5 to 6.

We claim:

1. A process for recovering molybdenum in the form of molybdic acid from alumina containing spent catalysts containing molybdenum oxide or molybdenum sulfide comprising treating the alumina containing spent catalyst with an aqueous solution of sodium carbonate at a temperature of from 60° to 100° C, and in a quantity in excess of that stoichiometrically necessary for obtaining the molybdenum in the form of sodium molybdate and the sulfur in the form of sodium sulfate which excess expressed in weight of sodium carbonate does not exceed 10%, baking the sodium carbonate treated alumina containing spent catalysts at a temperature of from 600° to 800° C to convert the molybdenum present to sodium molybdate, cooling to a temperature of from 70° to 80° C, dissolving the sodium molybdate by washing in hot water at a temperature of from 60° to 100° C, cooling the dissolved sodium molybdate to a temperature not exceeding 30° C, neutralizing the cooled solution of sodium molybdate by continuously introducing concentrated nitric acid at a temperature not exceeding 30° C and at a rate of flow adjusted to achieve a pH value of 5 to 6 to convert the sodium molybdate to molybdic acid, further adding nitric acid to clarify the nitric acid solution, and precipitating molybdic acid.

2. A process in accordance with claim 1 wherein the alumina containing spent catalysts are subjected to a preliminary oxidizing roasting to free the same from volatile materials, carbon and part of the sulfur.

3. A process in accordance with claim 1 wherein the hot water solution of sodium molybdate is cooled to a temperature not exceeding 30° C and then subjected to successive treatments with concentrated nitric acid at rates of flow resulting in a pH of 5 to 6.

4. A process in accordance with claim 1 wherein the molybdic acid precipitate is kept in suspension, filtered, washed with water containing 2% by volume of concentrated nitric acid, and dried.

5. A process in accordance with claim 1 wherein the sodium carbonate solubilizes the molybdenum present in the alumina containing spent catalysts and is added in a quantity in excess of that stoichiometrically necessary for obtaining the molybdenum in the form of sodium molybdate and the sulfur in the form of sodium sulfate, which excess expressed in weight of sodium carbonate is equal to between 1 and 3% of the total weight of the waste products.

6. A process in accordance with claim 1 wherein the baking of the sodium carbonate treated alumina containing spent catalysts is conducted at a temperature in the range from 650° to 750° C to convert the molybdenum present to sodium molybdate.

7. A process in accordance with claim 1 comprising cooling the hot water solution containing sodium aluminate as well as sodium molybdate to a temperature not exceeding 30° C, neutralizing the solution with nitric acid of a concentration of about 53% at a rate of flow adjusted so that the pH value is in the order of 5.2 to 5.5, clarifying the nitric acid solution by further addition of nitric acid, precipitating molybdic acid at a temperature of about 100° C, filtering, washing with water containing 2% by volume of concentrated nitric acid, and drying the filtered and washed molybdic acid.

* * * * *